Nov. 3, 1970  H. H. CLASSEN  3,537,651
DEVICE FOR AERATING WATER UNDER PRESSURE, PARTICULARLY
FOR HOUSEHOLD WATER SUPPLY

Filed Dec. 27, 1967  3 Sheets-Sheet 1

INVENTOR.
HANS HEINRICH CLASSEN
BY
AGT.

Nov. 3, 1970 — H. H. CLASSEN — 3,537,651
DEVICE FOR AERATING WATER UNDER PRESSURE, PARTICULARLY FOR HOUSEHOLD WATER SUPPLY
Filed Dec. 27, 1967 — 3 Sheets-Sheet 2

INVENTOR.
HANS HEINRICH CLASSEN
BY
AGT.

Nov. 3, 1970  H. H. CLASSEN  3,537,651
DEVICE FOR AERATING WATER UNDER PRESSURE, PARTICULARLY
FOR HOUSEHOLD WATER SUPPLY
Filed Dec. 27, 1967  3 Sheets-Sheet 3

INVENTOR.
HANS HEINRICH CLASSEN
BY
Robert H. Jacob
AGT.

United States Patent Office 3,537,651
Patented Nov. 3, 1970

3,537,651
DEVICE FOR AERATING WATER UNDER PRESSURE, PARTICULARLY FOR HOUSEHOLD WATER SUPPLY
Hans Heinrich Classen, Lobberich, Germany, assignor to Firma Rokal G.m.b.H., Lobberich, Germany
Filed Dec. 27, 1967, Ser. No. 693,914
Claims priority, application Germany, Jan. 9, 1967, R 34,269
Int. Cl. E03c 1/08
U.S. Cl. 239—428.5     10 Claims

ABSTRACT OF THE DISCLOSURE

Aerating device for attachment to water faucet which has a perforated transverse wall or plate with the perforations offset in steps inwardly and downwardly so that the lower parts of the perforations are narrower than the upper parts, which provides for improved aeration and easier cleaning of the device.

BACKGROUND OF THE INVENTION

The invention relates to a device for aerating water flowing under pressure, particularly in household water supply systems where outside air freely enters at the water discharge location below a perforated transverse wall, and a mixing device, for example a screen element, is arranged which effects the dividing of the water and intimate mixing with air, and where the water passage channels in the transverse wall present cross-sections of different magnitude over their longitudinal extent.

In known aerating devices of this type, the water passage channels were so constructed that the cross-section of the entrance aperture at the upper end of each channel was smaller than the cross-section of the channel connected thereto at the lower end. This known manner of construction, however, had the shortcoming that in the production of the transverse wall a ridge or film was easily formed at the transition between the narrowed entrance cross-section and the subsequent expanded cross-section which constituted a complete or partial closure of the particular channel and made the same entirely or partly ineffective, a defect which even with careful inspection was difficult to discern. A further shortcoming of the known form of construction was that in the event of clogging it was very difficult to clean the device.

SUMMARY OF THE INVENTION

It is an object of the present invention to eliminate these shortcomings, essentially in that the water passage channels at the water entrance side are of larger cross-section than at the water discharge side. Such a form of construction of the transverse wall may also be readily produced from suitable plastics by injection, and it possesses the advantage of easy cleaning and nevertheless, makes possible a sufficiently effective aerating action under the conditions required for devices of this type.

In particular, the entrance apertures of the channels in accordance with the invention can be in the form of graded step-like recesses in the transverse wall so that, as a whole, a channel form is obtained which over its longitudinal extent is offset by two or more steps.

Generally, a continuous step-like narrowing of the channel cross-section will be advisable, but embodiments of the invention are also possible where, for example, the second step is greater or higher than the entrance step, and thus undercuts the entrance step and alternating cross-sections are formed. This can prove to be advantageous for the formulation of flow of the water rays or jets and for good aerating effect.

Generally, the invention also provides embodiments where a step-like entrance recess is associated with several channels that are connected with it.

BRIEF DESCRIPTION OF THE DRAWINGS

Further advantages and details of the invention will become apparent from the following description of the embodiments illustrated in the drawings in which.

DESCRIPTION OF THE PREFERRED EMBODIMENT

Figure 1:
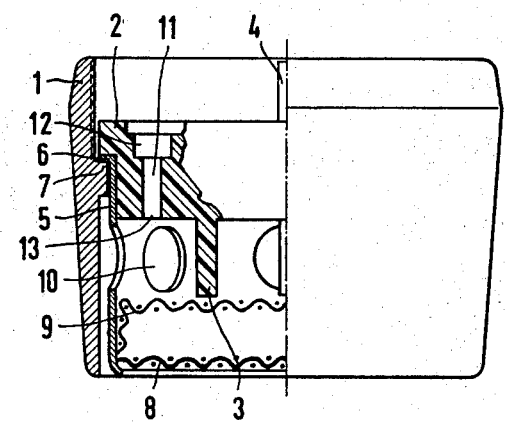
FIG. 1 is a partial cross-section of an aerating device in accordance with the invention.

In the drawings the housing 1 of an aerating device is illustrated which is preferably made of metal, and which may be connected to a water outlet such as a tap by means of threads. A perforated transverse substantially planar wall member 2, formed preferably of plastic material, is provided which at its lower side presents three supports 3 and on its upper side is provided with a stud 4 for use as a handle. The transverse wall 2 is pressed into a sleeve of metal in the embodiment illustrated, but in such a manner that it can be separated from the sleeve 5 for the purpose of cleaning. The sleeve 5 has an annular flange 6 which rests on a shoulder 7 of the housing on which also the transverse wall 2 is supported. Between sleeve 5 and the housing 1, an annular space is formed for entrance of air from below. In the lower part two screens 8 and 9 are pressed into the sleeve and the sleeve is provided above these screens with apertures 10 for the entrance of air into the space between transverse wall 2 and the screens 8, 9.

Figure 2:
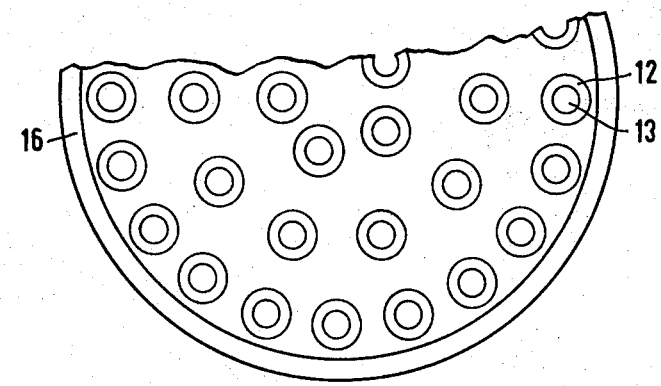
FIG. 2 is a partial plan view of the transverse wall structure.

In the embodiment in accordance with FIGS. 1 and 2, the water passage channels in the transverse wall 2 are set off in steps along their longitudinal extent, and in such a manner that the entrance aperture 12 of the channels has a larger cross-section than the discharge aperture 13. Particularly FIG. 2 reflects the fact that the entrance steps 12 are concentric with the outlet steps 13.

Figure 3:
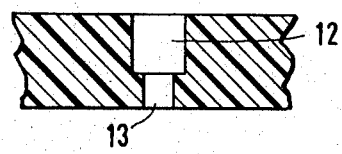
FIG. 3 is a partial section of a modification of a device in accordance with FIGS. 1 and 2.

While in FIGS. 1 and 2 the entrance steps 12 are longitudinally of shorter extent than the outlet steps 13, FIG. 3 shows an embodiment of the invention where the entrance steps 12 are of greater length than the outlet steps 13.

Pressure and flow conditions may be decisive in determining one or the other form of construction.

Figure 4:
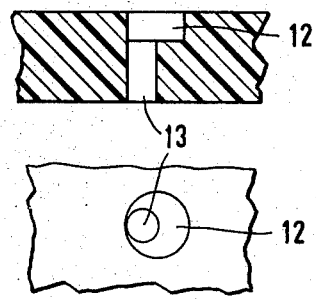
FIG. 4 is a partial section of a further embodiment with the associated plan view.
Figure 5:
FIG. 5 is a partial section of a still further embodiment and the associated plan view.
Figure 5:
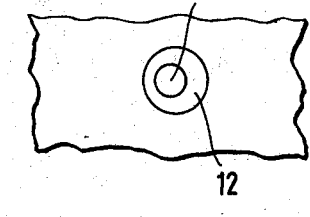
Figure 5:
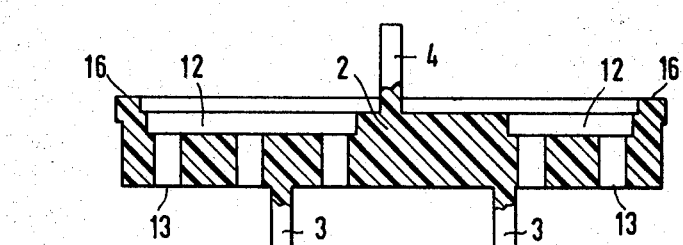

In FIGS. 4 and 5 two embodiments are illustrated where the entrance step 12 is eccentrically arranged with respect to the outlet step 13, which is a form of construction that may be advisable under certain conditions for production reasons.

Figure 6:
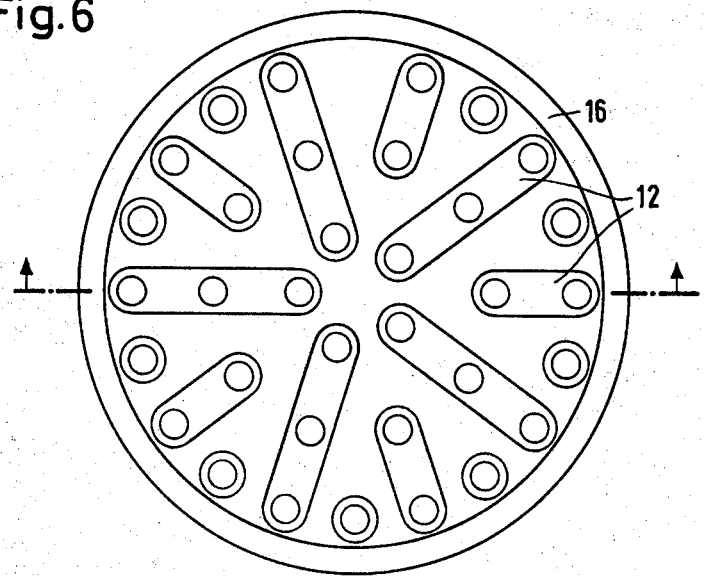
FIG. 6 shows a different type of construction of the invention in cross-section and plan view.

FIG. 6 illustrates a form of construction of the improvement in accordance with the invention in section and in plan view where several outlet steps 13 (for example, 2 or 3) are encompassed by a common entrance step 12. A similar proposition can also be accomplished in that the entrance steps 12 are in the form of annular recesses relative to the associated eccentrically arranged circles of the outlet steps.

Figure 7:
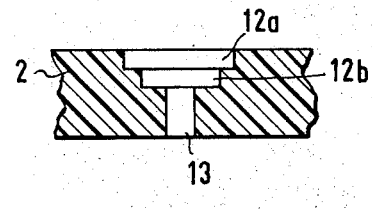
FIGS. 7 and 8 are two further embodiments shown in partial cross-section.
Figure 8:
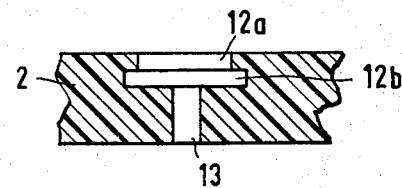

FIG. 7 illustrates an embodiment where the entrance opening is defined by steps 12a and 12b that follow one another, while in FIG. 8 an embodiment is illustrated where the entrance step 12b is of larger cross-section than the entrance steps 12a, and thus undercuts the entrance step 12a.

Figure 9:
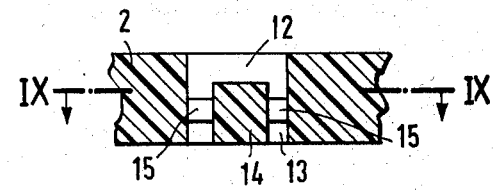
FIG. 9 is a different embodiment of the invention in partial cross-section.
Figure 10:
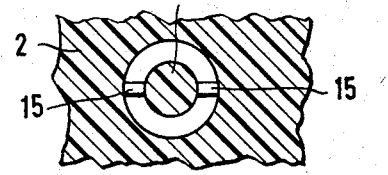
FIG. 10 is a section taken along the line IX—IX in FIG. 9.

In the embodiment illustrated in FIGS. 9 and 10, the decrease of the cross-section of the outlet steps 13 is defined by a central body 14 which is supported on the inner wall of the channel, for example, by ribs 15.

With such a form of construction, the central body can cause a hollow stream of water to discharge by way of the transverse wall which as a consequence of its larger surface provides particularly advantageous effects. The hollow stream, as a whole, is contacted by a greater quantity of air and divides more rapidly into water drops so that the thorough mixing with air on the screens is enhanced.

Figure 11:
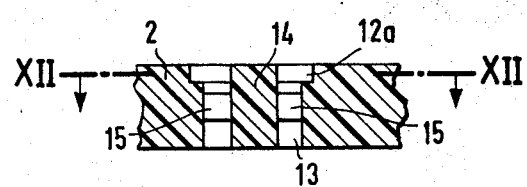
FIG. 11 is a further embodiment in partial cross-section.
Figure 12:
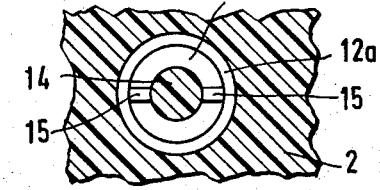
FIG. 12 is a section taken along line XII—XII in FIG. 11.

While in FIGS. 9 and 10 the upper entrance step 12 is defined by the center member 14, FIGS. 11 and 12 illustrate an embodiment of the invention where the center member 14 is drawn up to the entrance side of the channel and the expansion of the entrance cross-section is defined by a special step 12a.

In general, the center body or member can also be provided in transverse walls having multi-stepped entrance openings where the center member extends into one or more of these apertures.

In this and similar ways, the invention makes possible an aerating device which possesses the special quality that its transverse wall is provided with passage apertures which are larger at the top and which are subsequently of smaller form. The transverse wall per se may advantageously be made of plastic material in all cases.

The channels may also be of polygonal cross-section. In all cases an upper ceiling border may be provided as indicated at 16.

The invention has been described with reference to the embodiments illustrated in the drawings and what it is desired to protect by Letters Patent is set forth in the appended claims.

What is claimed is:

1. Device for aerating water under pressure as for example in household water systems, comprising, a casing and a transverse, unitary substantially planar wall member formed of plastic material and having a plurality of elongated channels extending therethrough, each of said channels comprising an entrance aperture and a discharge aperture, said entrance aperture presenting a larger cross-section for the entrance of water than the discharge aperture, said channels being arranged to produce a plurality of individually spaced streamlets of water at the downstream end of said member, the downstream side of said member being exposed to air to admit air to said streamlets of water, and mixing screen means disposed at a distance from the downstream end of said member.

2. Device in accordance with claim 1 where apertures in the form of recessed steps are defined in said channels in said transverse wall member at said entrance side.

3. Device in accordance with claim 2, where a plurality of channels share a common recessed step.

4. Device in accordance with claim 2, where said recessed steps are eccentric with respect to the channel portions below them.

5. Device in accordance with claim 3, where said recessed steps are eccentric with respect to the channel portions below them.

6. Device in accordance with claim 1, comprising central bodies disposed centrally of the water discharge side of said channels constituting narrow channel portions.

7. Device in accordance with claim 2, comprising central bodies disposed centrally of the water discharge side of said channels constituting narrow channel portions.

8. Device in accordance with claim 3, comprising central bodies disposed centrally of the water discharge side of said channels constituting narrow channel portions.

9. Device in accordance with claim 4, comprising central bodies disposed centrally of the water discharge side of said channels constituting narrow channel portions.

10. Device in accordance with claim 5, comprising central bodies disposed centrally of the water discharge side of said channels constituting narrow channel portions.

References Cited

UNITED STATES PATENTS

| 2,603,469 | 7/1952 | Bedford et al. | 239—428.5 |
| 2,633,343 | 3/1953 | Aghrides | 239—428.5 |
| 2,998,933 | 9/1961 | Aghrides | 239—428.5 |

FOREIGN PATENTS 640,992  6/1962  Italy.

LLOYD L. KING, Primary Examiner